Apr. 24, 1923. 1,452,549
R. CONRADER
APPARATUS FOR TREATING OILS FROM FLOWING WELLS
Filed May 20, 1920 3 Sheets-Sheet 3
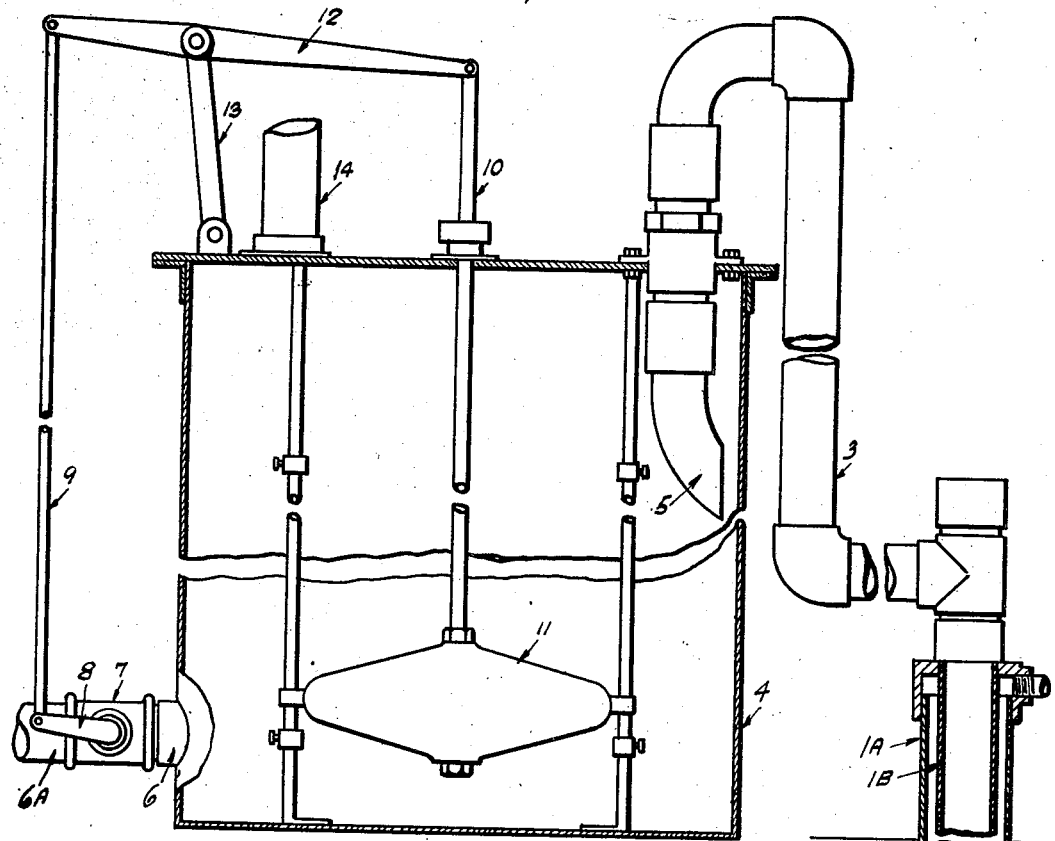
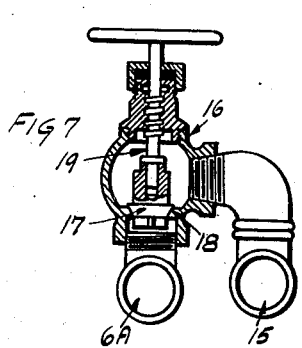
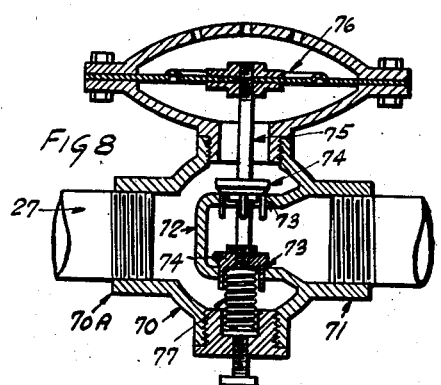

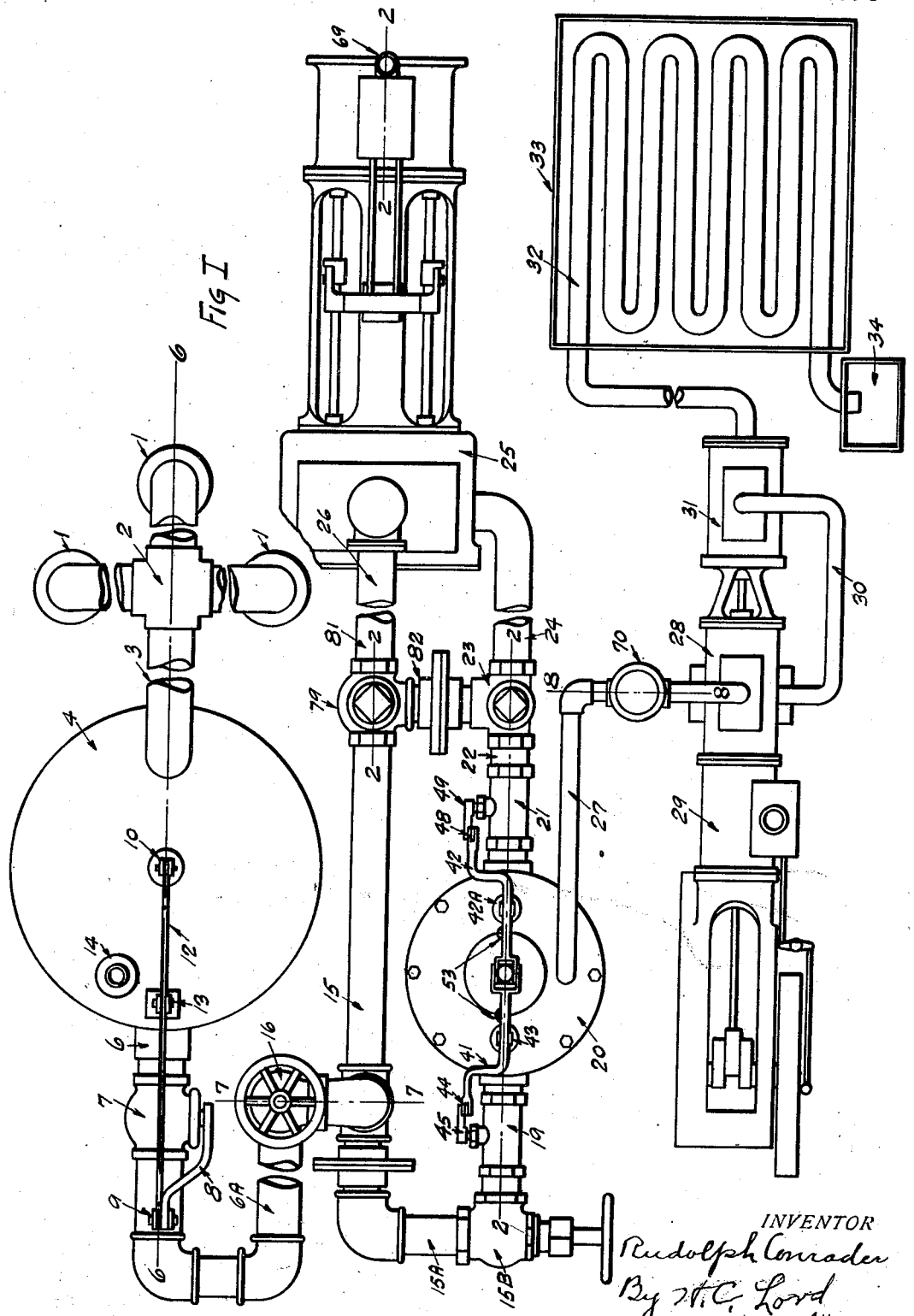

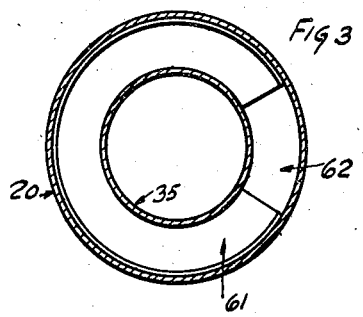
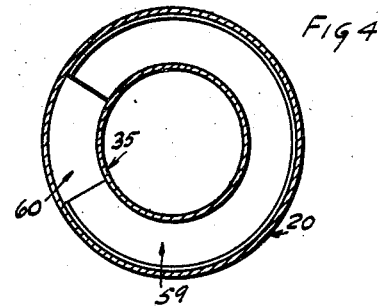
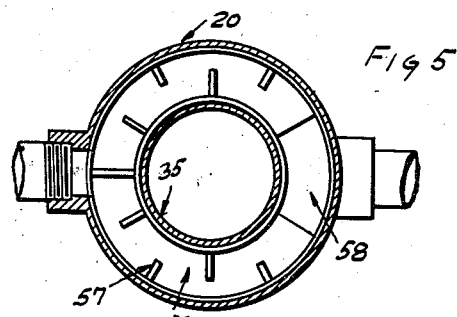
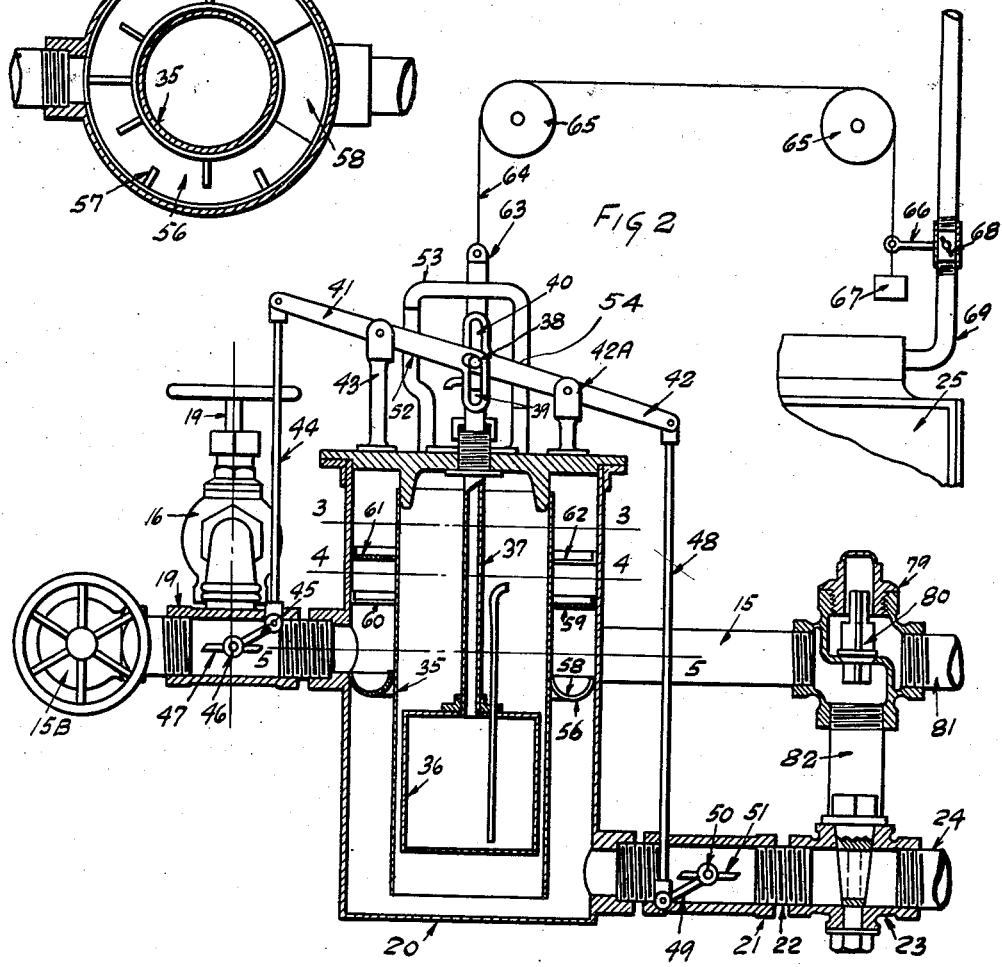

Patented Apr. 24, 1923.

1,452,549

UNITED STATES PATENT OFFICE.

RUDOLPH CONRADER, OF ERIE, PENNSYLVANIA.

APPARATUS FOR TREATING OILS FROM FLOWING WELLS.

Application filed May 20, 1920. Serial No. 382,758.

*To all whom it may concern:*

Be it known that I, RUDOLPH CONRADER, a citizen of the United States, residing at Erie, in the county of Erie and State of Pennsylvania, have invented new and useful Improvements in Apparatus for Treating Oils from Flowing Wells, of which the following is a specification.

In treating oils from flowing wells it is common to separate the free gases as the oil is expelled from the well. The oil is then carried to some point of storage but still contains a large amount of gas which ordinarily evaporates and is lost. With the present invention the free gases are separated in the ordinary manner but the oil is afterwards treated by being subjected to a partial vacuum to take out those gases which would ordinarily evaporate and be lost. In taking out these gases it is desirable to control the separation so as to maintain a gravity of the oil which will make it readily marketable.

The apparatus forming the subject matter of the invention and with which the method may be practiced is illustrated as follows:—

Fig. 1 is a plan view of the apparatus.
Fig. 2 a section on the line 2—2 in Fig. 1.
Fig. 3 a section on the line 3—3 in Fig. 2.
Fig. 4 a section on the line 4—4 in Fig. 2.
Fig. 5 a section on the line 5—5 in Fig. 2.
Fig. 6 a section on the line 6—6 in Fig. 1.
Fig. 7 a section on the line 7—7 in Fig. 1.
Fig. 8 a section on the line 8—8 in Fig. 1.

1 marks the flowing oil well. There may be a plurality of these as shown in Fig. 1. They have the usual casing 1$^a$ and the tube 1$^b$ from which the oil is expelled by the free pressures of the well, the oil ordinarily containing large quantities of free gas. The oil is carried from the wells 1 to the manifold or fitting 2 and from it by a pipe 3 to a separator 4, the pipe 3 being carried into the separator and discharging through a nozzle 5 which agitates the oil and throws it in a direction away from the discharge 6 so as to give the free gases a free opportunity for separation. The discharge is controlled by a valve 7, the valve being swung by an arm 8. A link 9 connects the arm 8 with a lever 12. The lever 12 is pivotally mounted on a post 13 and connects with the stem 10 connected with a float 11. The gas is carried off from the separator 4 by a gas pipe 14. The discharge pipe 6$^a$ leads to a pipe 15, the valve 16 controlling the connection. The valve 16 has a check 17 operating on a seat 18 (see Fig. 7) and a stem 19 for locking the check in closed position. The oil is carried by a pipe 15$^a$ to a valve 19. A valve 15$^b$ permits the closing of this connection. When the valve 19 discharges there is a discharge to a separating tank 20. The oil is discharged from the separating tank 20 through a valve 21, pipe 22, valve 23, and pipe 24 leading to the inlet of the pump 25, the pump discharging through a pipe 26.

The gas is carried from the separating tank 20 by a pipe 27, the pipe 27 connecting with a low pressure cylinder 28 of a compressor 29. The gas is carried from the low pressure cylinder by a pipe 30 usually having an intercooler (not shown) to the high pressure cylinder 31 where the gas is compressed and delivered to a condensing coil 32 arranged in a cooling vat 33, the condensed gasoline being collected in a tank 34.

A float compartment 35 is arranged in the separator 20, this compartment being preferably in communication with the separating tank 20 near the bottom so that this compartment carries comparatively dead oil. A float 36 operates in the compartment. A stem 37 extends from the float 36 and has a cross pin 38 at its upper end extending into the oppositely disposed slots 39 and 40 on the levers 41 and 42 respectively. The lever 41 is pivotally mounted on a post 43 connected by a link 44 with an arm 45. The arm 45 is mounted on a shaft 46 and the shaft 46 carries a butterfly valve 47 controlling the inlet to the separating chamber. The lever 42 is pivotally mounted on a post 42$^a$ and is connected by a link 48 with an arm 49, the arm 49 being mounted on a shaft 50 carrying the butterfly valve 51 and controlling the outlet from the separating tank. It will be noted that these valves control the inflow and outflow of oil. The oppositely disposed slots permit of a one-way movement of each of the levers through the action of the pin 38, the levers being locked against movement in the opposite direction, the lever 42 engaging a stop 52 on a frame 53 extending from the tank and the lever 42 engaging a stop 54 on the frame 53. When the oil rises in the tank the lever 41 is actuated closing the valve 47 and when the oil recedes in the tank the lever 42 is operated closing the valve 51. The oil enters the separating tank through a separating passage which is an annular passage between the walls of the compartment and the separating chamber. It has a bottom 56, deflectors 57 and a discharge opening 58. Thus the oil is agitated and moved in a tortuous passage so as to permit the liberation of gases. The gases separated are carried through a tortuous passage provided by the plate 59 with an opening 60 and a second plate 61 with an opening 62, the openings 60 and 62 being out of register. By reason of this tortuous passage foaming is prevented from reaching the gas outlet.

It is desirable to control the discharge pump from the separating tank so that it may draw from the tank in accordance with the delivery to the tank. This is accomplished by the following mechanism: An extension 63 is formed on the stem 37. A cable 64 runs from the extension 63 over a pulley 65 to the arm 66. A weight 67 controls the arm 66. The arm 66 controls a valve 68 in the supply pipe 69 of the pump. The separating tank is maintained under a vacuum and this is controlled by a regulating valve 70 having an inlet 70$^a$ and outlet 71. The regulating valve is provided with a diaphragm 72 with a seat 73 and the valves 74 are in balanced relation. A stem 75 extends from the valves to the diaphragm 76. A spring 77 tends to open the valve against the diaphragm. The outer part of the diaphragm is subjected to atmospheric pressure. The spring 77 may be adjusted to give any partial vacuum desired by a screw 78. If an excess of flow is carried to the pipe 15 it may be discharged by way of a valve 79 having a weighted check 80 and discharges to a pipe 81 extending to a common delivery with the pipe 21. The separating chamber may be bypassed through a pipe 82 extending to the valve 23, the valve 23 being preferably a three-way valve for this purpose.

With this apparatus the free gases are separated preferably with a pressure at or above atmosphere and what might be termed the evaporating gases are separated at a partial vacuum. The vacuum should be controlled so that the gravity of the residual oils will be marketable. Ordinarily the residual oils may be left in a more marketable condition than where this treatment is not used. At the same time the gases drawn off may be utilized.

What I claim as new is:—

1. In an apparatus for treating oils from flowing wells, the combination of a separator taking off the free gas as the oil is delivered; a second separator operating under a partial vacuum to which the oil is delivered by the first-mentioned separator; means for taking off the gas freed from the oil under the partial vacuum; a pump for drawing oil from the second separator; and means controlling the pump to draw off the oil in proportion to the delivery of oil to the second separator.

2. In an apparatus for treating oils from flowing wells, the combination of a separator taking off the free gas as the oil is delivered; a second separator operating under a partial vacuum to which the oil is delivered by the first-mentioned separator; means for taking off the gas freed from the oil under the partial vacuum; a pump for drawing oil from the second separator; means controlling the pump to draw off the oil in proportion to the delivery of oil to the second separator; and automatic means controlling the discharge of oil from the second separator.

3. In an apparatus for treating oils from flowing wells, the combination of a separator taking off the free gas as the oil is delivered; a second separator operating under a partial vacuum to which the oil is delivered by the first-mentioned separator; means for taking off the gas freed from the oil under the partial vacuum; a pump drawing oil from the second separator; and automatic means controlling the discharge of oil from the second separator.

4. In an apparatus for treating oils from flowing wells, the combination of a separator taking off the free gas as the oil is delivered; a second separator operating under a partial vacuum to which the oil is delivered by the first-mentioned separator; means for taking off the gas freed from the oil under the partial vacuum; a pump drawing oil from the second separator; and automatic means controlling the inflow and outflow from the second separator.

In testimony whereof I have hereunto set my hand.

RUDOLPH CONRADER.